UNITED STATES PATENT OFFICE.

CHARLES E. COFFIN, OF DENVER, COLORADO, ASSIGNOR OF ONE-HALF TO ROBERT N. JONES, OF SAME PLACE.

COMPOSITION OF MATTER FOR PAVING-BLOCKS, &c.

SPECIFICATION forming part of Letters Patent No. 383,942, dated June 5, 1888.

Application filed April 13, 1888. Serial No. 270,544. (No specimens.)

*To all whom it may concern:*

Be it known that I, CHARLES E. COFFIN, a citizen of the United States of America, residing at Denver, in the county of Arapahoe and State of Colorado, have invented certain new and useful Improvements in Composition of Matter for Paving-Blocks, Tiles, &c., of which the following is a specification.

My invention relates to a composition of matter especially adapted for use in the manufacture of paving-blocks, tiles, and other articles for use in similar relations or under similar conditions. Such articles, it is well settled, should be homogeneous, hard, and firm, yet possess a certain degree of elasticity that they may bear the wear and tear of travel, or of any other use, and resist the crushing effect of any superimposed weight, of close texture, and, as far as possible, non-porous; that they may be water-repellent and not affected by hygrometric conditions, of low heat-absorbent power or conductivity; that they may not be injured or changed by thermal variations, yet a composition that may be molded or formed into any desired shape.

The object, therefore, of my invention is to furnish a composition for paving-blocks, tiles, floorings, &c., meeting these requirements, yet one comparatively economical in the cost of its ingredients, and their preparation or combination, capable of being formed into any shape suitable for the purpose for which it is to be used, the products being adapted to be as readily used or applied as any of the common forms of such articles, durable and reliable in any of the situations or relations they may be employed in, to which ends the invention consists in the features more particularly hereinafter described and claimed.

In practicing my invention the following ingredients are used: Silica, oxide of iron, lime, alumina, barium, zinc, manganese, and lead. In using these ingredients they may be taken in any of the forms in which they are ordinarily met with. For instance, the silica may be in the shape of pure sand, or of quartz, or any mainly silicious rock, and the alumina may be in the shape of ordinary clay, or any other of what are ordinarily termed "aluminous earths or compounds," and the lime may be the ordinary calcium, or it may be a carbonate. These materials are used in such relative proportions that they will readily fuse and coalesce into one homogeneous compound, and to that end the proportions of each may be somewhat varied. For instance, I have found that the proportions of each may be varied within the following limits, and yet this end be secured: silica, thirty to forty-five; oxide of iron, forty to twenty-five; lime, three to eight; alumina, fourteen to eight; barium, three to eight; zinc, three to one; manganese, six to two; lead, one to three. In practice, however, I prefer about or very close to the following proportions as giving the best results: silica, forty; oxide of iron, thirty-four; lime, five; alumina, ten; barium, five; zinc, one; manganese, four; lead, one. These materials may be thoroughly blended and then molded into shape, either with or without the addition of water, and then placed in a kiln or oven, where such degree of heat may be applied as to fuse together the materials either wholly or in part. I prefer, however, to blend the materials and fuse them together, and while in such fused condition cast the liquid composition into the desired shape, such shapes or forms being then allowed to gradually cool. So treated, the resultant blocks or shapes are especially adapted for pavements, roadways, tiles, &c., and for use in any relation or situation where a firm, hard, durable, and weather-resisting material is needed.

If desired, the blocks or tiles may be enameled with any of the ordinary vitreous or other enamels, and in any patterns or shapes to better fit them for ornamental uses, or to form tile-patterns.

Having thus described my invention, what I claim is—

The composition of matter hereinbefore described, consisting of silica, oxide of iron, lime, alumina, barium, zinc, manganese, and lead, combined in the proportions substantially as set forth.

In testimony whereof I affix my signature in presence of two witnesses.

CHARLES E. COFFIN.

Witnesses:
 Z. F. WILBER,
 R. C. ADY.